Aug. 14, 1951  V. ADAM  2,564,516
EQUIPMENT FOR FORMING OF SMALL GLASS ARTICLES
Filed Oct. 15, 1948  2 Sheets-Sheet 1

Inventor
Vaclav Adam,
By Pierce, Scheffler & Parker
Attorneys.

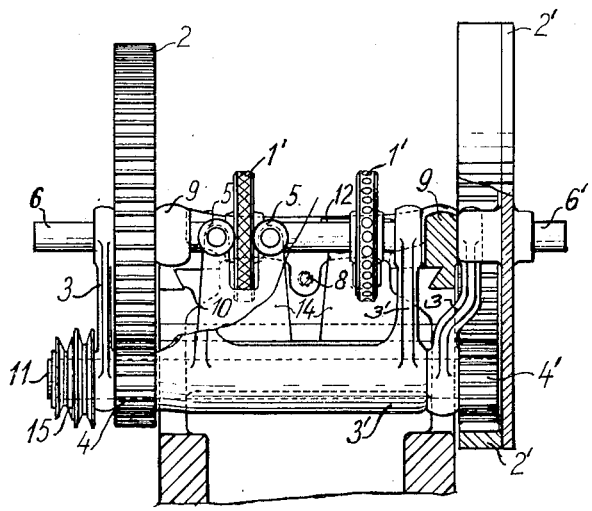
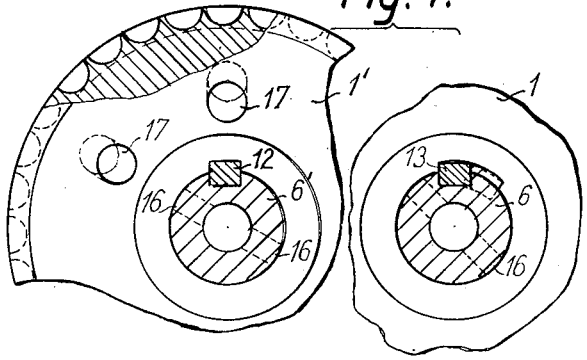
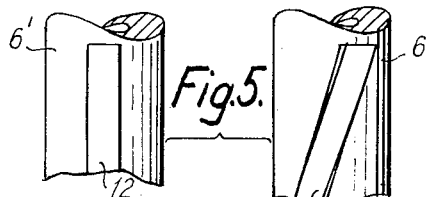

Patented Aug. 14, 1951

2,564,516

UNITED STATES PATENT OFFICE 2,564,516

EQUIPMENT FOR FORMING OF SMALL GLASS ARTICLES

Václav Adam, Jablonec nad Nisou, Czechoslovakia, assignor to "Ceskoslovenske zavody sklarske, narodni podnik," Prague, Czechoslovakia Application October 15, 1948, Serial No. 54,778
In Czechoslovakia October 13, 1947

2 Claims. (Cl. 49—29)

The present invention relates to apparatus for forming small glass articles such as rhinestones or pearls, buttons and the like.

The actual method of molding small glass articles between two countermoving die rollers has been applied in many constructions more or less successfully. Constructions with an exact synchronism of the die rollers do not have a sufficient output and on the other hand, constructions capable of a greater output, such as constructions with die rollers of large diameter, or with a high speed of rotation, or having more sets of molds on one die roller present also disadvantages, such as excessive heating of the die rollers, axial displacement of them, imperfect regulation of distance between the roller axes, and the like.

The object of this invention is to overcome the mentioned disadvantages in pressing small glass objects between two die rollers by providing for the adjustment of the die rollers in such a way that the mold cavities in the superface of the cooperating rollers are maintained coaxial under all circumstances.

A further object of the invention is to provide for a fine adjustment of the distances between the superfaces of the die rollers.

Figure 1:
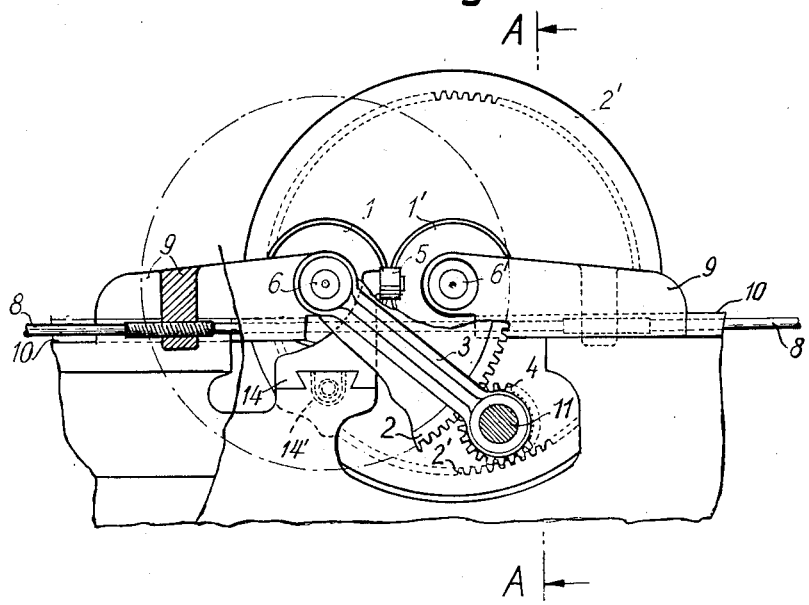
Figure 2:
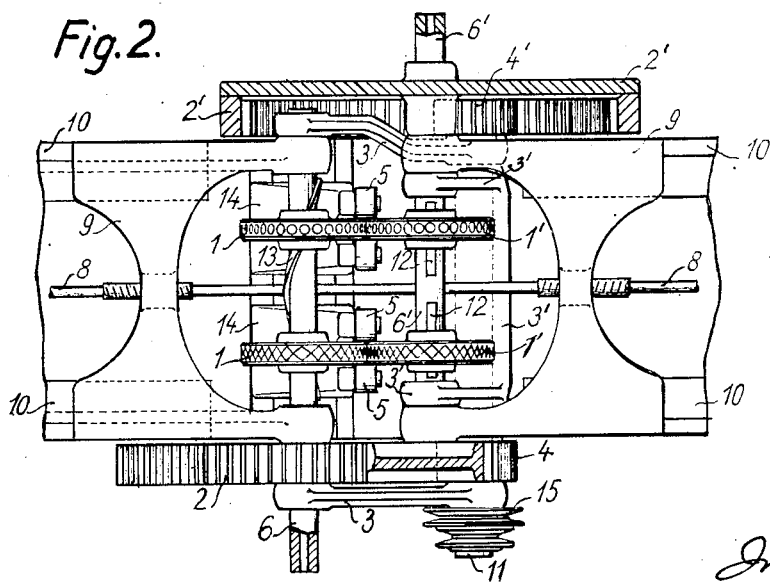

A still further object of this invention is to provide an arrangement of the drive of the die rollers in which pinions on a drive shaft engage with an externally toothed gear on the drive shaft of one die roller and with an internally toothed gear on the drive shaft of an opposed die roller, which arrangement eliminates the effect of mechanical inaccuracies of the gear toothing. These and other objects and advantages of the invention will be apparent from the following description and reference to the accompanying drawings in which:

Fig. 1 is the front view of the machine for pressing glass objects with some parts broken away and some in section, Fig. 2 is a top plan of the machine with parts in section, Fig. 3 is a section through the machine on the line A—A of Fig. 1, Fig. 4 is a partial section on an enlarged scale across the shafts of the die rollers with part of one die roller in section and Fig. 5 is a top plan fragmentary view of the shafts of the die rollers showing the keys on the shafts for engagement with the die rollers.

Referring now more particularly to the drawings, Figs. 1, 2 and 3 and 4 show die rollers 1 and 1' which are slidably mounted on spline shafts 6 and 6', respectively, the drive of the rollers being transmitted by keys 12 and 13. The shafts 6 and 6' are mounted in supports 9 which are slidably mounted on guides 10 and adjustable toward and away from each other by means of an adjusting screw 8 which has oppositely threaded portions engaging the respective supports. In this way an adjustment of the distance between the shafts 6 and 6' and consequently an adjustment of the working faces of the die rollers 1 and 1' is obtained. The shaft 6 is driven by gear wheel 2 provided with external toothing and the shaft 6' by gear wheel 2' provided with an internal toothing. Both gear wheels 2 and 2' have an equal number of teeth with the same pitch. Pinion gears 4 and 4' mounted on a shaft 11 engage the respective gear wheels 2 and 2', the shaft 11 being journalled in the extremities of pairs of pivoted levers 3 and 3' journalled respectively on the shafts 6—6'. Any change of play between the teeth is eliminated in this way due to the fact that by any change of distance between the die rollers and consequently between the shafts 6 and 6' the pinions 4 are maintained in constant mesh with the gear wheels 2 and 2'.

The die rollers 1 and 1' are movably axially on the shafts 6, 6'. The rollers 1' on the shaft 6' are splined to the shaft by keys 12 which are parallel with the axis of the shaft, while the rollers 1 on the shaft 6 are splined thereto by a spiral key 13, as shown in the Figs. 2, 4 and 5. By an axial movement of a pair of coacting die rollers, their relative rotative position is changed, as the roller 1' slides on the shaft 6' provided with a straight key 12 without turning, while the roller 1 rotates as it slides on its shaft 6, being forced to this movement by the spiral key 13.

The axial movement of the die rollers 1—1' on the shafts 6—6' and their retention aligned with each other in the adjusted position is accomplished by spaced guide rollers 5 which engage opposite sides of the respective pairs of die rollers at the point of peripheral contact. The guide rollers 5 are journalled in pairs on forked carriers 14 which are adjustable transversely of the frame, being adjusted and held in adjusted position by a conventional type of manually adjusted screw feed indicated at 14' in Fig. 1. The shaft 11 carrying the pinions 4 is driven by a pulley 15.

As shown in Figs. 2 and 4, the shafts 6—6' are hollow and their hollows communicate with the external atmosphere through openings 16 in such a way that the air introduced into the hollow shafts and flowing out through the openings 16 cools the die rollers. The rollers may be provided with oblique openings 17 for the purpose of a better cooling, as shown in Fig. 4.

The apparatus according to this invention works as follows: By means of the screw 8 a desired adjustment of the peripheral faces of the die rollers toward or away from each other is made and by an axial movement of the die rollers on the shafts 6—6' by means of adjusting the respective pairs of guide rollers 5 axially of the shafts 6—6', coaxiality of the mold cavities in the die rollers is obtained. By fixing the forked carriers 14 in adjusted position, the die rollers 1—1' are secured against axial shifting. The glass to be molded is fed downwardly between opposed pairs of die rollers and drawn into the space between them and as the desired articles are pressed from it they fall on a conveyor (not shown) as will readily be understood.

I claim:

1. Apparatus for forming small glass articles by molding between opposed die rollers comprising a pair of parallel driven shafts, opposed die rollers mounted on said shafts, means for adjusting said shafts toward and away from each other; means for driving said rollers simultaneously in opposite directions comprising an internally toothed gear on one of said shafts and an externally toothed gear on the other of said shafts having the same pitch circle, a pair of levers pivoted on said shafts, a driving shaft journalled in said levers, and spur gears mounted on said driving shaft engaging said internally and externally toothed gears.

2. Apparatus according to claim 1 in which said die rollers are axially adjustable on the respective driven shafts, a linear spline connection is provided between one of said driven shafts and its die roller, a spiral spline connection is provided between the other driven shaft and its die roller, and axially adjustable roller members engage opposite sides of said die rollers adjacent the point of working engagement thereof for maintaining said die rollers in axial and transverse alignment.

VÁCLAV ADAM.

REFERENCES CITED

The following references are of record in the file of this patent:

UNITED STATES PATENTS

| Number | Name | Date |
|---|---|---|
| 2,456,697 | Gruenwald | Dec. 21, 1948 |